(12) United States Patent
Leonov

(10) Patent No.: US 11,195,347 B2
(45) Date of Patent: Dec. 7, 2021

(54) OPERATION AND RIDING DATA COLLECTION DEVICE, AND CONNECTIVITY PLATFORM, FOR POWERSPORTS VEHICLES

(71) Applicant: MOTOLINK LLC, New York, NY (US)

(72) Inventor: Alex Leonov, New York, NY (US)

(73) Assignee: MotoLink LLC, New York, NY (US)

( * ) Notice: Subject to any disclaimer, the term of this patent is extended or adjusted under 35 U.S.C. 154(b) by 0 days.

(21) Appl. No.: 16/519,210

(22) Filed: Jul. 23, 2019

(65) Prior Publication Data
US 2021/0027554 A1  Jan. 28, 2021

Related U.S. Application Data

(60) Provisional application No. 62/716,326, filed on Aug. 8, 2018.

(51) Int. Cl.
| | |
|---|---|
| G07C 5/02 | (2006.01) |
| H04W 4/90 | (2018.01) |
| H04W 4/44 | (2018.01) |
| H04W 4/02 | (2018.01) |
| H04L 29/08 | (2006.01) |
| H04W 84/04 | (2009.01) |
| H04W 84/12 | (2009.01) |
| G01S 19/13 | (2010.01) |
| B62J 99/00 | (2020.01) |
| B62J 11/00 | (2020.01) |

(Continued)

(52) U.S. Cl.
CPC .............. *G07C 5/02* (2013.01); *H04W 4/025* (2013.01); *H04W 4/44* (2018.02); *H04W 4/90* (2018.02); *B62J 11/00* (2013.01); *B62J 45/00* (2020.02); *B62J 45/10* (2020.02); *B62J 50/20* (2020.02); *B62J 99/00* (2013.01); *G01S 19/13* (2013.01); *H04L 67/10* (2013.01); *H04W 84/042* (2013.01); *H04W 84/12* (2013.01)

(58) Field of Classification Search
CPC ............ G07C 5/02; H04W 4/44; H04W 4/90; H04W 4/025; H04W 84/042; H04W 84/12; B62J 50/20; B62J 45/10; B62J 45/00; B62J 11/00; B62J 99/00; G01S 19/13; H04L 67/10
See application file for complete search history.

(56) References Cited

U.S. PATENT DOCUMENTS

| | | | | |
|---|---|---|---|---|
| 5,882,076 A | * | 3/1999 | Garelick | A47C 3/18 248/411 |
| 2002/0105423 A1 | * | 8/2002 | Rast | B60Q 1/44 340/479 |

(Continued)

*Primary Examiner* — Dinh Nguyen

(57) ABSTRACT

A vehicle operation and riding data collection device includes a housing defining an internal cavity, a power source supported by the housing in the internal cavity, a communications element supported by the housing in the internal cavity, a global positioning element supported by the housing in the internal cavity, at least one sensor supported by the housing in the internal cavity, and a processor configured to manage the power source, the communications element, the global positioning element, and the at least one sensor, to perform functional features corresponding to providing vehicle operation and riding data to, and receiving input from, a user.

26 Claims, 11 Drawing Sheets

Vehicle Operation and Riding Data Collection Device with a User Interface Panel Featuring a Pushbutton

(51) Int. Cl.
*B62J 45/00* (2020.01)
*B62J 45/10* (2020.01)
*B62J 50/20* (2020.01)

(56) References Cited

U.S. PATENT DOCUMENTS

| | | | |
|---|---|---|---|
| 2002/0188329 A1* | 12/2002 | Struble | A61N 1/36564 607/23 |
| 2004/0176047 A1* | 9/2004 | Trively | H04M 1/0214 455/90.3 |
| 2005/0121935 A1* | 6/2005 | Bell | B62J 99/00 296/78.1 |
| 2005/0134504 A1* | 6/2005 | Harwood | H04M 1/6091 342/357.74 |
| 2007/0093947 A1* | 4/2007 | Gould | G07C 5/008 701/31.5 |
| 2007/0147017 A1* | 6/2007 | Eom | H05K 7/026 361/809 |
| 2008/0004788 A1* | 1/2008 | Dorfstatter | H04L 67/12 701/117 |
| 2009/0012676 A1* | 1/2009 | Kawamura | F02D 41/042 701/38 |
| 2009/0046383 A1* | 2/2009 | Greathouse | B60R 1/06 359/842 |
| 2009/0237245 A1* | 9/2009 | Brinton | G07C 5/008 340/540 |
| 2011/0093159 A1* | 4/2011 | Boling | G06Q 10/06 701/29.6 |
| 2011/0118914 A1* | 5/2011 | Brooks | B61L 3/006 701/20 |
| 2011/0156893 A1* | 6/2011 | Hwang | B60R 1/12 340/442 |
| 2013/0060467 A1* | 3/2013 | Nash | G01C 21/12 701/500 |
| 2013/0290199 A1* | 10/2013 | Camacho | G01S 5/0027 705/317 |
| 2015/0329062 A1* | 11/2015 | Ackeret | B60N 3/002 248/220.22 |
| 2015/0356795 A1* | 12/2015 | Warren | H04B 17/318 701/31.5 |
| 2016/0300378 A1* | 10/2016 | Thomas | G07C 5/008 |
| 2016/0325685 A1* | 11/2016 | Chen | G01S 19/14 |
| 2016/0364679 A1* | 12/2016 | Cao | G06Q 50/30 |
| 2018/0011704 A1* | 1/2018 | Middleton | H04B 1/38 |
| 2019/0324464 A1* | 10/2019 | Yang | G05D 1/0214 |

\* cited by examiner

… (1) …

OPERATION AND RIDING DATA COLLECTION DEVICE, AND CONNECTIVITY PLATFORM, FOR POWERSPORTS VEHICLES

BACKGROUND OF THE INVENTION

Field of the Invention

The present invention generally relates to vehicle operation, and more specifically, to a device to collect and communicate vehicle operation and riding data usable with various user functions.

Description of Related Art

Many vehicles have integrated or distributed systems to collect certain vehicle data to use for various functions. For example, on-board diagnostic systems collect vehicle data from various vehicle sensors, the collected vehicle data being relevant to diagnose potential or present component problems or failures. Some vehicles integrate equipment necessary to offer a concierge service, such as General Motors®, OnStar® service, and report information relevant to various services offered by the concierge service. For example, vehicle location can be collected and reported to the concierge service to assist in reporting an emergency. Other concierge services include in-vehicle security, hands-free calling, turn-by-turn navigation, and remote diagnostics. These integrated systems are particular to a single vehicle and cannot be transferred from one vehicle to another. These integrated systems also are installed by the vehicle manufacturer or installation specialist, and cannot be easily installed by a vehicle owner. Furthermore, no concierge services have been integrated with, or available for, powersports vehicles.

Some stand-alone devices that collect vehicle operation and riding data also exist for particular dedicated functions, such as accident detection and reporting. All these devices, whether self-contained or integrated as part of a vehicle, are limited in their narrowly scoped functions.

SUMMARY OF THE INVENTION

A self-contained, vehicle operation and riding data collection device is disclosed. The vehicle operation and riding data collection device features a connectivity platform to facilitate various user and third party functions, including an interface via smart device and cloud software. The device is transportable between vehicles and can provide operation and/or riding data to an operator, an insurance company, a vehicle manufacturer, a vehicle fleet manager, a vehicle rental company, a concierge service, an emergency service provider, and others. The device is easily configurable for each different use.

In one embodiment, the vehicle data collection device includes a vehicle operation and riding data collection device including a housing defining an internal cavity, a power source supported by the housing in the internal cavity, a communications element supported by the housing in the internal cavity, a global positioning element supported by the housing in the internal cavity, at least one sensor supported by the housing in the internal cavity, and a processor configured to manage the power source, the communications element, the global positioning element, and the at least one sensor, to perform functional features corresponding to providing vehicle operation and riding data to, and receiving input from, a user.

DETAILED DESCRIPTION OF THE INVENTION

Figure 1A:
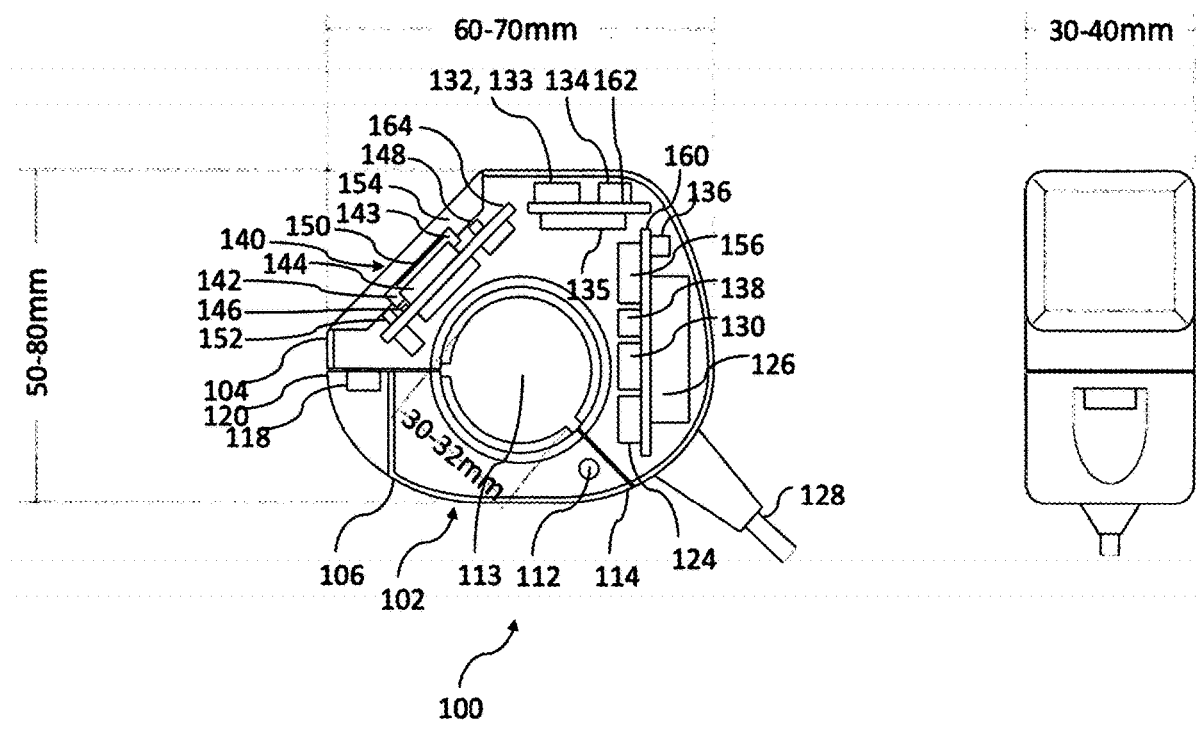
FIG. 1A is a side view of a vehicle operation and riding data collection device, according to an embodiment of the present invention.

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely exemplary.

The terminology used herein is for the purpose of describing particular example embodiments only and is not intended to be limiting. As used herein, the singular forms "a", "an", and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The terms "about" and "approximately", when used with a specific value, unless specified otherwise, shall mean any value within a range from the value given plus or minus 10 percent of the value given. For example, "approximately 10" can be any value from 9 to 11, and can also be limited to any range around 10 narrower than the range 9 to 11.

Figure 2:
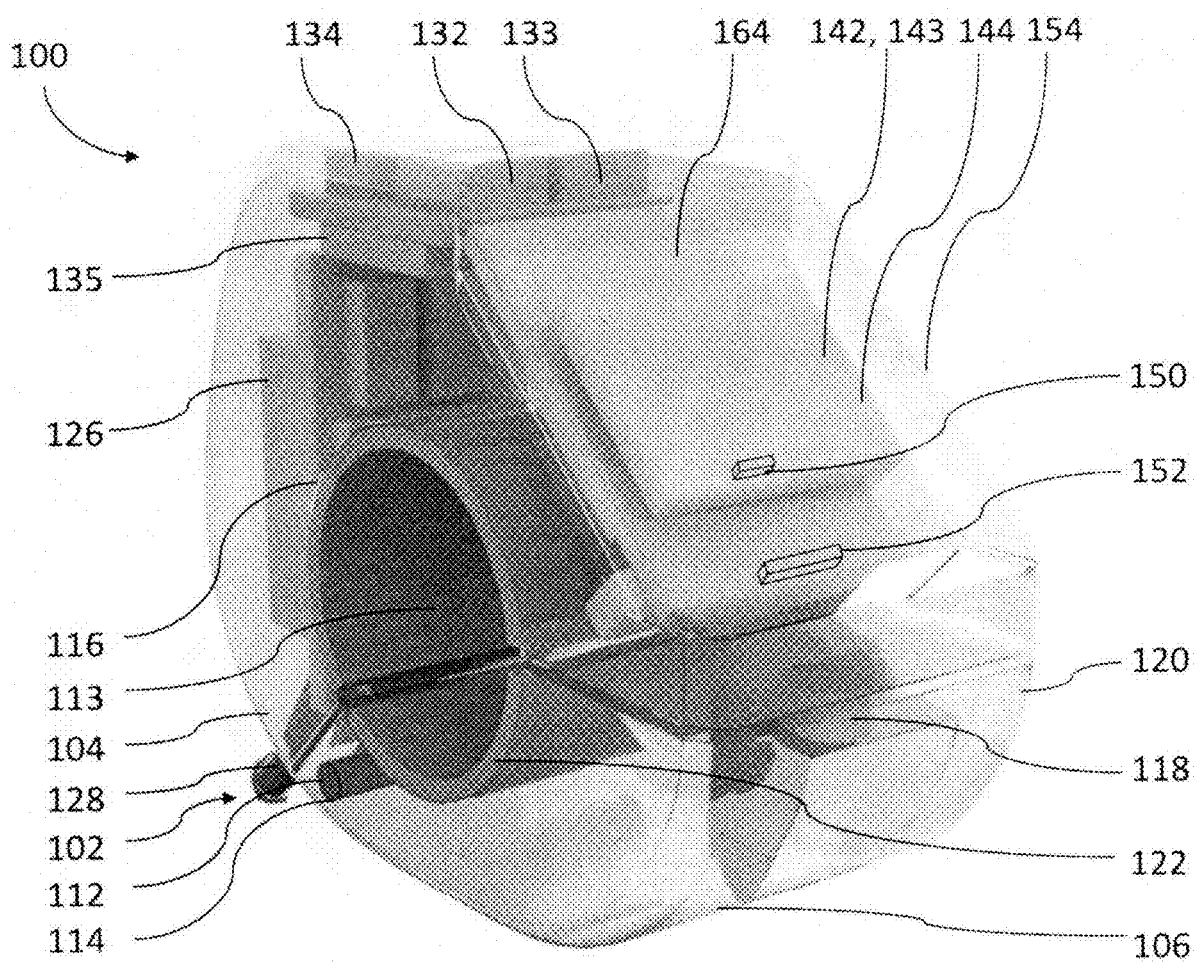
FIG. 2 is a front-side isometric view illustrating the vehicle operation and riding data collection device of FIG. 1A.

FIG. 1A is a front-side isometric view illustrating a vehicle operation and riding data collection device 100, according to an embodiment of the present invention. FIG. 2 is a left-side isometric view illustrating the vehicle operation and riding data collection device 100 of FIG. 1A. As discussed above, the vehicle operation and riding data collection device 100 is self-contained and transportable between vehicles, and can provide operation and/or riding data to an operator, an insurance company, a vehicle fleet manager, a vehicle rental company, a concierge service, an emergency service provider, and others. The device 100 offers a platform to which components responsible for facilitating different features, functions, and/or services can be added or removed, either within a single device 100, or in different models of the device 100.

Referring to FIG. 1A and FIG. 2, the vehicle operation and riding data collection device 100 includes a housing 102 to house, protect, and physically support the components that facilitate the features, functions, and services provided by the vehicle operation and riding data collection device 100. The housing 102 includes a first housing member 104 and a second housing member 106, the second housing member 106 configured to be coupled with the first housing member 104. At least one of the first housing member 104 and the second housing member 106 defines an internal cavity 108, where components can be located and protected from dust, water, electrical shock, and other environmental hazards.

The housing 102 can also facilitate attachment to a vehicle, and accordingly, can include an attachment element configured differently for different vehicles. The vehicle data collection device 100 can conceivably be used with, or adapted for use with, any vehicle. The depicted embodiment is configured to be attached to a tubular member of a vehicle, or in particular, a handlebar, such as that of a motorcycle. The first housing member 104 and the second housing member 106 together form a clamp that can clamp around the tubular member or handlebar by pivoting from an open position to a closed (i.e. clamped) position. The second housing member 106 can pivot at a hinge 112 joining the second housing member 106 to the first housing member 104 at a first end 114 of the second housing member 106. In the closed position, the first housing member 104 and the second housing member 106 form a radially inward-facing annular wall 116, and the radially inward-facing wall 116 defines a tubular hole 113 that receives the vehicle's tubular member or handlebar. Further, a fastening element 118 can secure a second end 120 of the second housing member 106, opposite the first end 114, to the first housing member 104 to prevent pivoting of the second housing member 106 and lock the vehicle data collection device in the closed position. The radially inward-facing wall 116 can be lined with a gripping pad 122 to promote friction with the tubular member or handlebar, and to reduce wear against the surface of the tubular member or handlebar.

The internal components contained in the cavity 108 can include a power supply 124 and/or a power source 126 to power the vehicle operation and riding data collection device 100. The power supply 124 can receive an electrical signal from a cable 128 electrically connected to an external power source (not shown) that is external to the housing 102 of the vehicle operation and riding data collection device 100. For example, the external power source can be a battery of the vehicle. The power source 126 can be a battery also, though supported in the cavity 108 of the housing 102. A rechargeable battery, such as a lithium ion battery can save the cost and hassle of replacing disposable batteries, and can avoid battery compartment access issues. In case the power supply 124 fails, such as might occur during a vehicle accident or car breakdown, the power source 126 can continue providing power to the vehicle operation and riding data collection device 100. Alternatively, the power source 126 can be the primary source of power provided to the vehicle operation and riding data collection device 100.

The internal components contained in the cavity 108 can also include one or more sensors 130 to detect particular events, changes, or qualities related to the vehicle and its operation. The one or more sensors 130 can include, for example, an accelerometer, a tilt sensor, a gyroscope, an optical sensor, or other now-known or future-developed sensors. Data detected can correspond to vehicle acceleration, vehicle tilt, vehicle velocity, vehicle location, engine parameters, and more.

Figure 4:
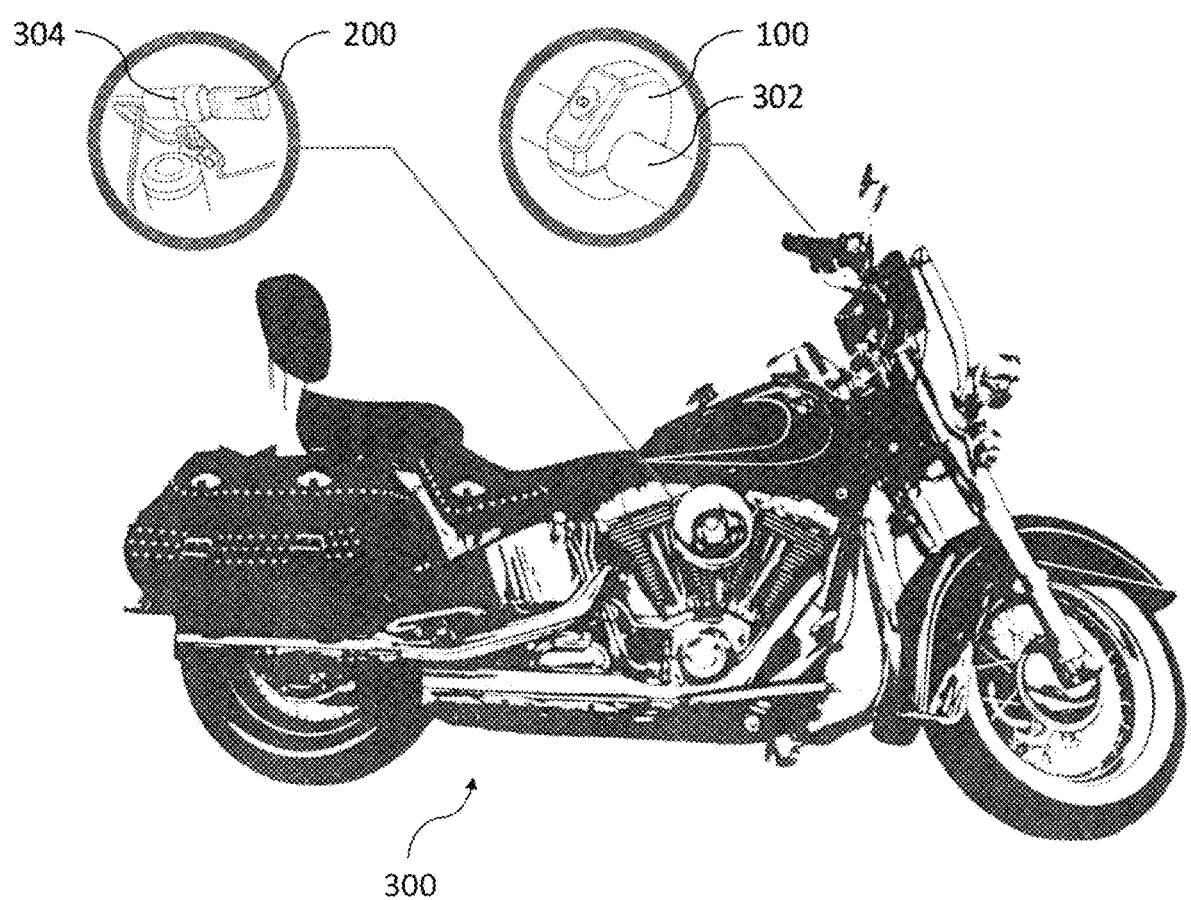
FIG. 4 illustrates a vehicle operation and riding data collection device attached to a handlebar of a motorcycle, and a vehicle diagnostic device positioned to be connected to an on-board diagnostic system port of the motorcycle.

In addition to vehicle data obtained by the sensors 130, a global positioning element, such as, but not limited to, a global positioning antenna 132 and receiver 133 configured to communicate with the Global Positioning System can facilitate collection of vehicle location data. Further, one or more communications elements 134, 135, 136, can include, but not be limited to, a mobile antenna, a wireless antenna, a wireless modem, a cellular network antenna, and a radio wireless local area networking antenna. Each of the different communications elements 134, 135, 136 can be configured for an appropriate communication with an appropriate device or network, such as a cellular carrier network (e.g. 4G or 5G), a local area network, or direct device-to-device. Some of these communications elements 134, 135, 136 can facilitate further collection of vehicle-related data. For example, via the communications elements 134, 135, 136, the vehicle operation and riding data collection device 100 can receive vehicle telemetry data previously collected by the vehicle or by another device connected to the vehicle. One such device includes a vehicle diagnostic device 200, as shown in FIG. 4, which illustrates a motorcycle 300, the vehicle operation and riding data collection device 100 attached to a handlebar 302 of the motorcycle 300, and the vehicle diagnostic device 200 positioned to be connected to an on-board diagnostic system port 304. U.S. patent application Ser. No. 15/941,573, which is incorporated herein by reference, describes the vehicle diagnostic device 200. The communications elements 134, 135, 136 can be configured to communicate with the vehicle diagnostic device 200 to receive diagnostic data, which is originally detected by sensors integrated with and/or distributed throughout the motorcycle.

Figure 3:
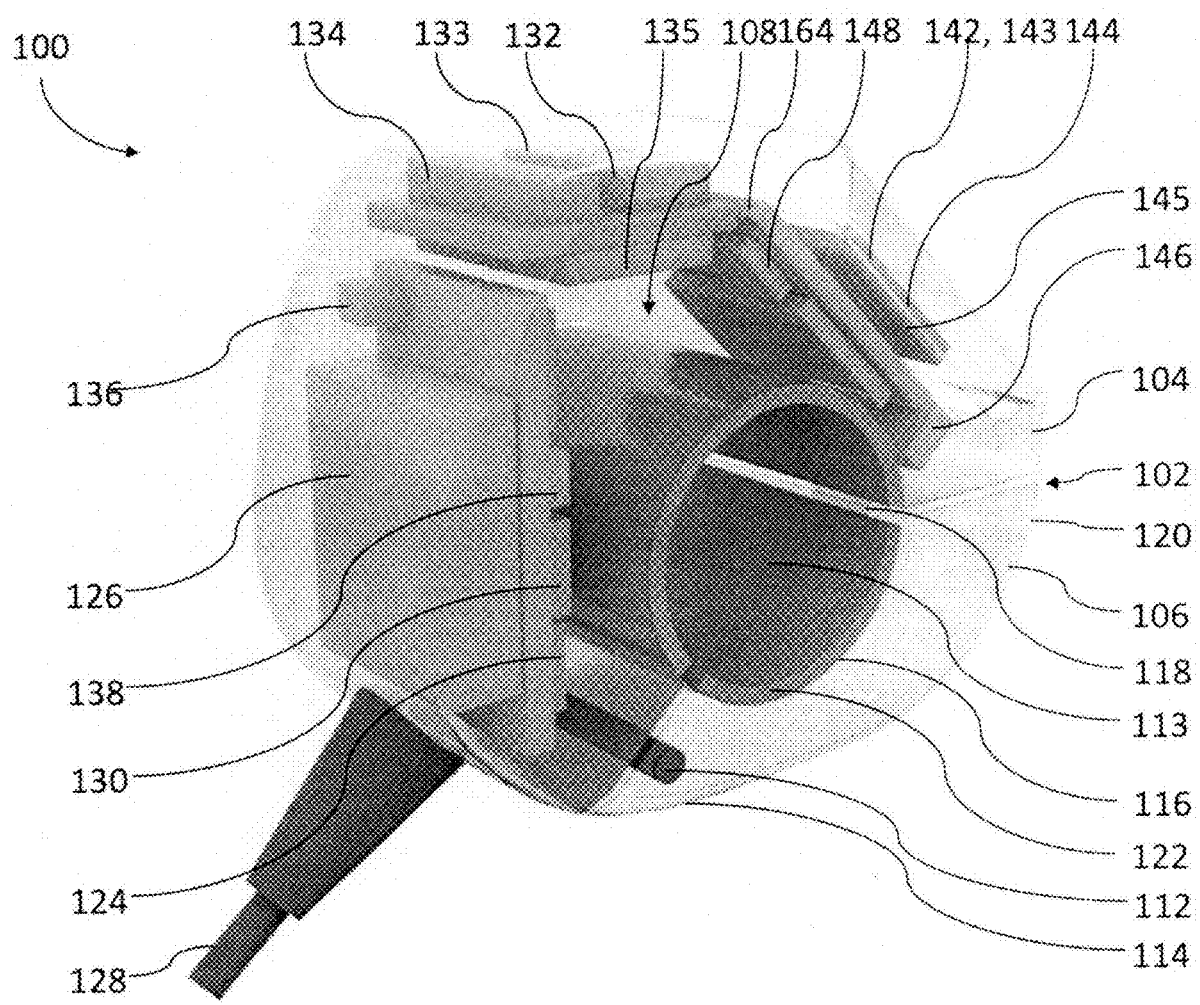
FIG. 3 is a rear-side isometric view illustrating the vehicle operation and riding data collection device of FIG. 1A.

Referring again to FIGS. 1A, 2, and 3, the data collected by the vehicle operation and riding data collection device 100 can be stored in a memory 138 and/or provided to the vehicle operator for personal use, to an insurance company to aid in setting individualized insurance rates, to a concierge service to enhance the services offered, to an emergency service provider, to a fleet manager (e.g. vehicle rental company or transport company), to a vehicle manufacturer to provide data that can increase vehicle safety, to vehicle dealers to improve particularized vehicle financing, as well as a vast variety of others. Vehicle operation and riding data collected can facilitate or enhance a variety of applications and services, including but not limited to predictive maintenance, usage-based insurance, vehicle safety studies, vehicle manufacturer's customer experience improvement, location-based services, telematics exchanges, value added offers by dealers and other qualified third-party service providers, roadside assistance, training programs, ride planning, payment services, smart parking, navigation, etc. For example, the vehicle operation and riding data collection device 100 can enable a vehicle manufacturer to offer their customers such value-added services as predictive maintenance, tailored extended service contracts, concierge and roadside assistance services, customized offerings from a manufacturer and trusted partners, and more. In another example, for a fleet manager, the vehicle operation and riding data collection device 100 can be configured to provide tamper-proof, real-time vehicle operation and riding data, including mileage data, riding pattern data, crash detection data, vehicle health data, and more. Back end software used by the fleet manager can allow easy tracking of individual vehicles, and organized visualization of various data parameters, saving and converting of data, and more.

Figure 5:
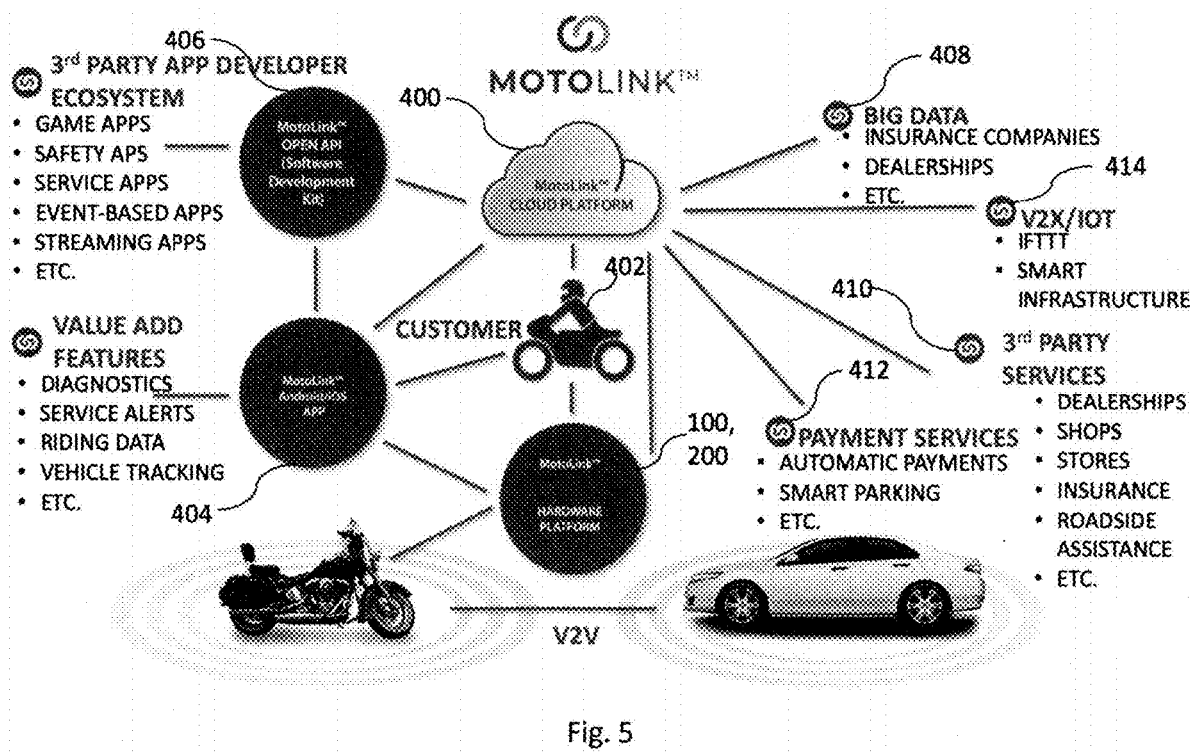
FIG. 5 is a diagram illustrating a cloud-based platform accessible by a user, and in communication with a variety of third party services and a vehicle operation and riding data collection device, according to an embodiment of the invention.

The communications devices 134, 135, 136 are configured to send and receive information signals to other devices, as desired. Further, a cloud-based platform can be a hub, whereby the vehicle operation and riding data collection device 100 communicates to and from the cloud-based platform, and to each other service provider or entity seeking to utilize the data collected by the vehicle operation and riding data collection device 100, or seeking to communicate with the vehicle operation and riding data collection device 100, can access the data and/or communicate to and from the vehicle operation and riding data collection device 100 via the cloud-based platform. FIG. 5 is a diagram illustrating a cloud-based platform 400 accessible by the user, operator, or customer 402, as well as third party users 408. A user 402 can be a vehicle operator or rider, while examples of a third party user 408 includes, but is not limited to, an insurance company, a fleet manager, a vehicle manufacturer, an emergency service, a concierge service, and a vehicle dealer. Data collected by the vehicle operation and riding data collection device 100 can be sent to a database in the cloud-based platform 400, which can use Blockchain technology for security and easy distribution of data. The devices 100, 200 can be accessed using a specified software application 404 running on any smart device, such as a smart phone, tablet, smartwatch, personal computer, laptop, etc. The cloud-based platform 400 can also be accessed using the specified software application 404. The user 402 can track vehicle and riding data in real time at the user interface panel 140 (see FIGS. 1-3), or using the specified software application 404 running on a smart device connected directly to the vehicle operation and riding data collection device 100 or the cloud-based platform 400.

The cloud-based platform 400 and the vehicle operation and riding data collection device 100 are configured to allow users 402 or third party developers 406 to create new software applications ("apps") that work with the vehicle operation and riding data collection device 100. For example, game apps, safety apps, services apps, event-based apps, and streaming apps can be desirable types of apps to run in complement with the cloud-based platform 400, the vehicle operation and riding data collection device 100, and/or the specified software application 404.

Third party users 408 can also be permitted access to the cloud-based platform 400 to access vehicle operation and riding data for their own purposes, or to provide services to the vehicle operator 402. These third parties and users 402 can create and/or use applications for use with the vehicle operation and riding data collection device 100 to suit their particular needs or desires. An insurance company, for example, can set more accurate and individualized premium rates based on riding data and vehicle diagnostic data. Third party users 408 can also use the data to offer services to the vehicle user. Service-offering third parties 410 can include, for example, vehicle dealerships, insurance companies, stores, shops, roadside and assistance providers. Third parties 408, 410 can have computing devices or smart devices with software configured to interact and/or communicate with the cloud-based platform 400, and to receive data particularized to their needs. Some services, such as payment services 412 (e.g. automatic payments, smart parking, etc.), can be integrated directly into the vehicle operation and riding data collection device 100—configuring the processor to run these applications. The third parties 408, 410 can also access the vehicle operation and riding data in real time.

In one example, the vehicle operation and riding data collection device 100 can enable a vehicle manufacturer to offer their customers such value-added services as predictive maintenance, tailored extended service contracts, concierge and roadside assistance services, customized offerings from a manufacturer and trusted partners, and more. In another example, for a fleet manager, the vehicle operation and riding data collection device 100 can be configured to provide tamper-proof, real-time vehicle operation and riding data, including mileage data, riding pattern data, crash detection data, vehicle health data, and more. Back end software used by the fleet manager can allow easy tracking of individual vehicles, and organized visualization of various data parameters, saving and converting of data, and more The vehicle operation and riding data collection device 100, alone or in combination with the cloud-based platform 400, can also facilitate vehicle-to-vehicle communication (referred to hereafter as "V2V") between vehicles equipped with the vehicle operation and riding data collection device 100 or another device that supports V2V communication protocol. Further, the vehicle operation and riding data collection device 100 can enable a vehicle's connection to the internet of things or a smart city infrastructure (referred hereinafter as "V2X") directly or using the cloud-based platform 400. V2V and V2X 414 technologies require each vehicle to have a wireless telematics unit onboard. The specified software application 404 is configured to implement current and future V2V and V2X standards. The vehicle operation and riding data collection device 100 can provide wireless telematics functionality required for millions of powersports vehicles (e.g., motorcycles, all-terrain vehicles, etc.) already in use that do not have telematics units onboard. The vehicle operation and riding data collection device 100 is configured to be able to integrate with the Internet of Things, such as but not limited to smart homes, traffic lights, and other smart features of smart cities and smart highway infrastructures.

Referring again to FIGS. 1A, 2, and 3, the vehicle operator, or an operator of the vehicle operation and riding data collection device 100, can directly access the collected data, and can control the functions, at a user interface panel 140. In FIG. 1A, the user interface panel 140 includes a pushbutton 142, to allow an operator to manually send a distress signal alerting emergency services to the location of the vehicle operation and riding data collection device 100, and/or to allow the operator to directly call and speak with an operator. The pushbutton 142 can include a cap 143 and a pushbutton switch and backlight LED 144 to illuminate the pushbutton 142. The cap 143 can be transparent or translucent so the backlight LED 144 can illuminate through the cap 143. The user interface panel 140 also can include a microphone 146 and a speaker 148, a biometric sensor 150 to facilitate secure access, and a connector 152 for a storage device or other electronic device to connect directly to the vehicle operation and riding data collection device 100. The biometric sensor 150 can be configured for compatibility with a vehicle's integrated security system, such that the biometric sensor 150 can be configured to lock, unlock, and/or start a vehicle's engine. A cover 154 can be moved between a closed, protective position covering the user interface panel 140 and an open, non-protective position allowing visual and tactile access to the user interface panel 140.

Figure 1B:
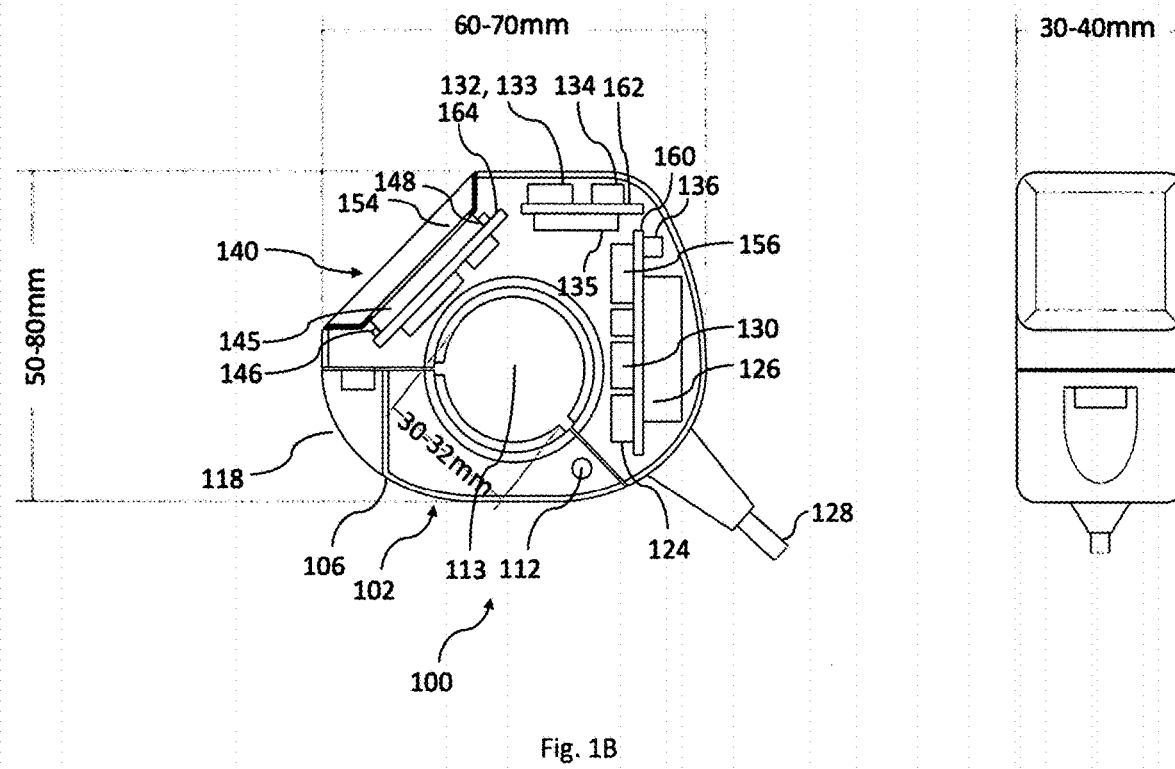
FIG. 1B illustrates a side view of a vehicle operation and riding data collection device, according to another embodiment of the present invention.

In FIG. 1B, an alternative embodiment of the user interface panel 140 is shown having a display screen 145. The display screen 145 can be an illuminated panel, such as a backlit LCD or LED display. The display screen 142 can be a touchscreen. In this embodiment, the pushbutton 142 of FIG. 1A can be embodied as a capacitive or virtual button on the display screen 145.

Figure 1C:
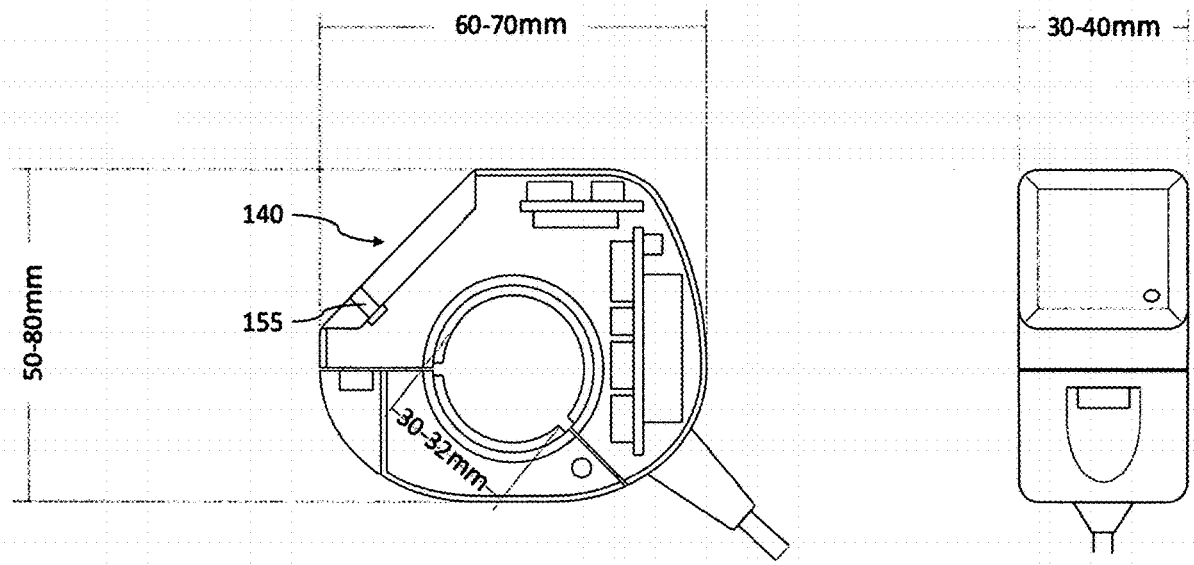
FIG. 1C illustrates a side view of a vehicle operation and riding data collection device, according to another embodiment of the present invention.

FIG. 1C illustrates a relatively simplified embodiment in which the cover 154 can be non-removably mounted because no features are accessible beneath the cover 154. An LED 155 can provide illumination from the user-interface panel 140.

Figure 6:
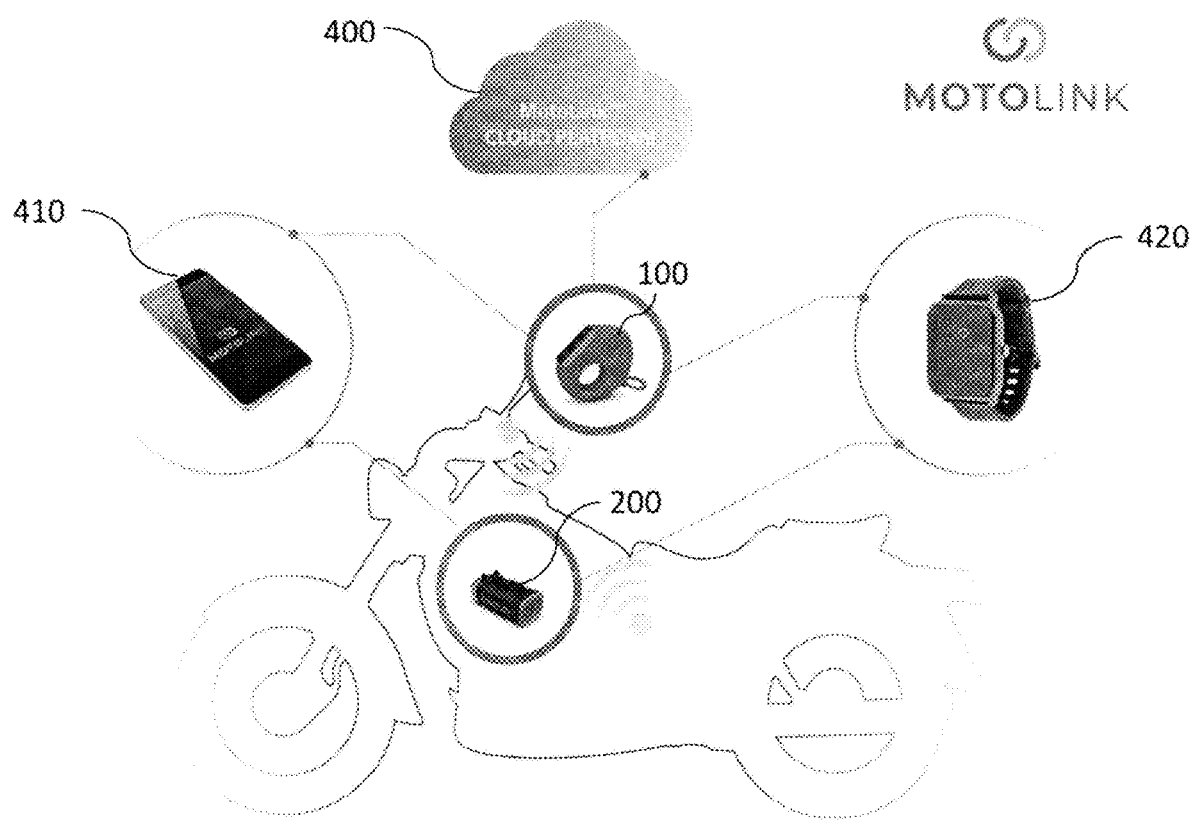
FIG. 6 is a diagram illustrating connectivity of a vehicle operation and riding data collection device, according to an embodiment of the invention, with a cloud-based platform, a smart phone, a smart watch, and a vehicle diagnostic device.

In addition to the ability to interface with, and control, the vehicle operation and riding data collection device 100 at the user interface panel 140, a variety of other now-known or future developed devices can be used to interface with, and control, the vehicle operation and riding data collection device 100 through direct communication with the communication elements 134, 135, 136 and/or the cloud-based platform 400. FIG. 6, for example, illustrates further connectivity of the vehicle operation and riding data collection device 100 with the cloud-based platform 400, a smart phone 410, a smart watch 420, and the diagnostic device 200.

Referring again to FIGS. 1-3, connecting all the electronic components of the vehicle operation and riding data collection device 100 is a processor or microcontroller 156. The processor 156 is configured to manage the other internal electronic components (i.e., the power supply 124, the power source 126, the at least one sensor 130, the global positioning elements (e.g., GPS antenna and receiver 132, 133), the communications elements 134, 135, 136, the memory 138, the display screen 142, the emergency pushbutton 143, the backlight LED 144, the microphone 146, the speaker 148, the biometric sensor 150, and/or the connector 152) to perform the functional features corresponding to providing data to and receiving input from, a vehicle operator, an insurance company, a concierge service, an emergency service provider, a fleet manager (e.g. vehicle rental company or transport company), the cloud-based platform 400 and services offered through the cloud-based platform 400, and/or others.

Figure 7:
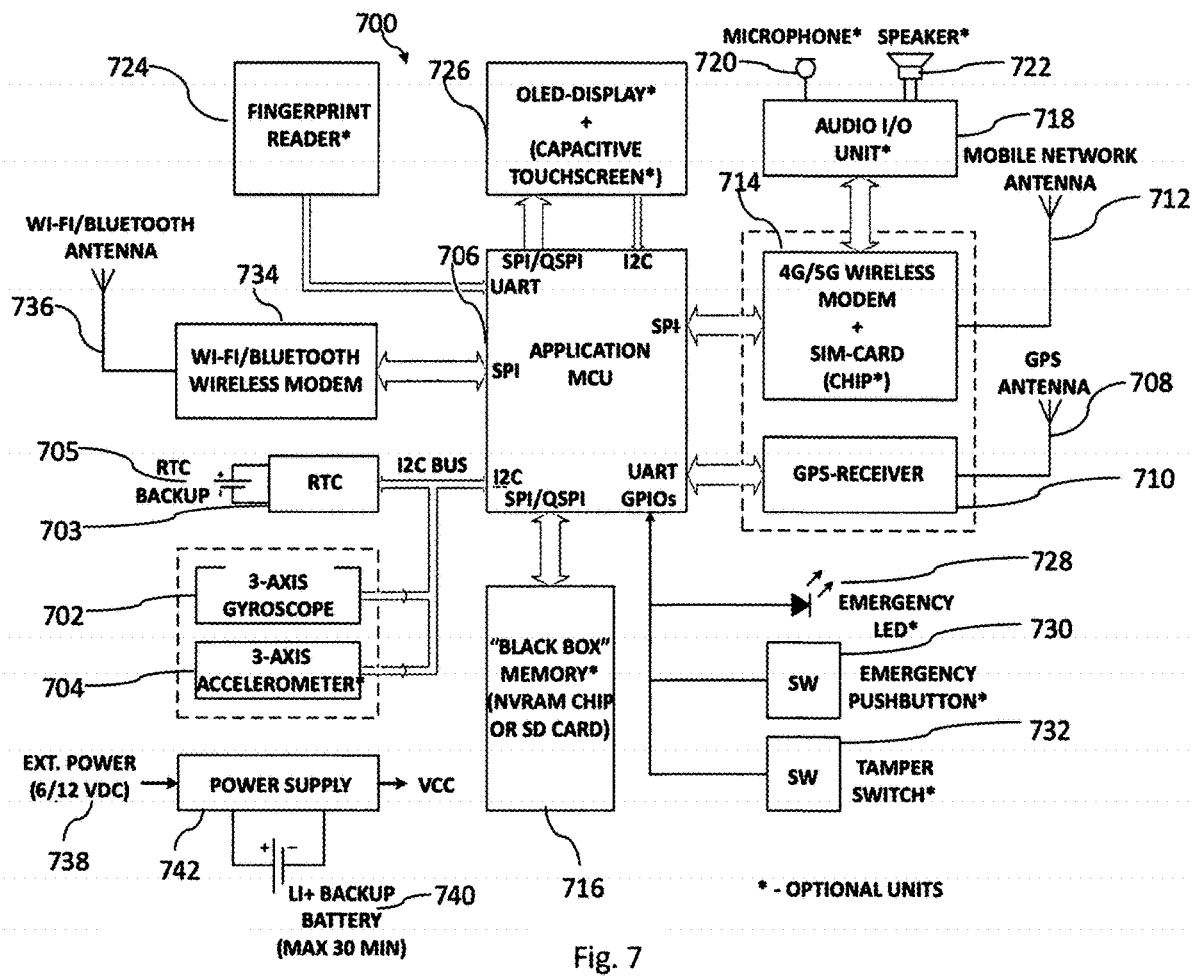
FIG. 7 is a schematic showing connectivity of each component of a vehicle operation and riding data collection device, according to an embodiment of the invention.

FIG. 7 is a schematic showing connectivity of each internal electronic component of a vehicle operation and riding data collection device 700. A three-axis gyroscope 702 and a three-axis accelerometer 704 can detect vehicle tilt and acceleration data. The gyroscope 702 is particularly useful for a motorcycle, to detect the tilt angle of the motorcycle. Data detected by the sensors 702, 704 is communicated to a microcontroller unit 706. A real-time clock 703 keeps time, which is useful to provide a time stamp to the microcontroller unit 706 corresponding to the data detected by sensors 702, 704. The real-time clock 703 has a backup power source 705 to provide power if a primary power source fails. Other detected and/or collected vehicle data can be sent to the microcontroller unit 706 as well. For example, a Global Positioning System antenna 708 and receiver 710 can receive vehicle geolocation data and send the geolocation data to the microcontroller unit 706. Vehicle geolocation data can also be received at a cellular network antenna 712 and wireless modem 714, and passed to the microcontroller unit 706. The mobile network antenna 712 allows the device to connect to a cellular 4G or 5G network in order to transfer data to the cloud, as well as enabling V2V and V2X communication. The mobile network antenna 712 can also be used to for concierge and emergency services.

The microcontroller unit 706 is in two way communication with a memory 716, so the microcontroller 706 can store and retrieve the vehicle data and other data. The wireless modem 714 is in two-way communication with an audio input/output unit 718, which includes a microphone 720 for input, and a speaker 722 for output. The audio input/output unit 718 can be used in conjunction with the wireless modem 714 and mobile mobile network antenna 712 for a user to speak with a third party (e.g., an emergency services dispatcher, or a representative at a third party service company, etc.) through the vehicle operation and riding data collection device 700.

A fingerprint reader 724 can be used to prevent unauthorized use of the vehicle operation and riding data collection device 700. The fingerprint reader 724 can be trained to a user's fingerprint, which the fingerprint reader 724 can detect. The detected fingerprint data can be communicated to the microcontroller unit 706, and if the fingerprint data is determined to represent a fingerprint of an authorized user, the microcontroller unit 706 can grant access.

An OLED display 726, which can be a capacitive touch screen, serves as a user interface with the vehicle operation and riding data collection device 700. The microcontroller unit 706 is in two-way communication with the display 726, receiving input from the display 726 as a result of input from a user, and controlling a response by the display 726.

An emergency LED 728, a pushbutton 730, and a tamper switch 732 each provide data to the microcontroller unit 706. The tamper switch 732 detects when someone has tampered with the device 700. When activated, the tamper switch 732 sends a signal to the microcontroller unit 706, and the microcontroller unit 706 can store a log of the tamper in the memory 716, or report the tamper to an insurance company or other appropriate entity. When the pushbutton 730 is pushed, a signal that the pushbutton 730 has been activated is sent to the microcontroller unit 706. In response, the microcontroller 706 manages a call to a call center operator utilizing the wireless modem 714 and the mobile network antenna 712. The operator can assist in a capacity desired by the user, including requests for information, connection to an emergency service dispatcher, etc. In the case the microcontroller 706 determines an accident has occurred, the microcontroller 706 sends a signal to activate the emergency LED 728, calling an emergency service provider using the wireless modem 714 and mobile network antenna 712, and sending vehicle location coordinates. The vehicle location coordinates can be sent via text message or internet, for example.

A second wireless modem 734 configured for use with Wi-Fi or Blue-tooth can be included, along with a second antenna 736, to provide connectivity over Blue-tooth or Wi-Fi to local area networks or compatible devices (e.g. smartphones, smartwatches, laptops, personal computers, the diagnostic device 200, etc.). Internet connection and connection to a cloud-based server or cloud based application can be accomplished conveniently through the second wireless modem 734 and the second antenna 736. A direct communication link can be established between the second wireless modem 734 and a vehicle diagnostic device to receive and pass to the microcontroller unit 706 vehicle diagnostic data.

The vehicle operation and riding data collection device 700 receives an electrical signal from an external power source 738, and alternatively from an internal rechargeable battery 740. A power supply 742 receives the electrical signal and converts the electrical signal to an appropriate voltage and current.

Figure 8A:
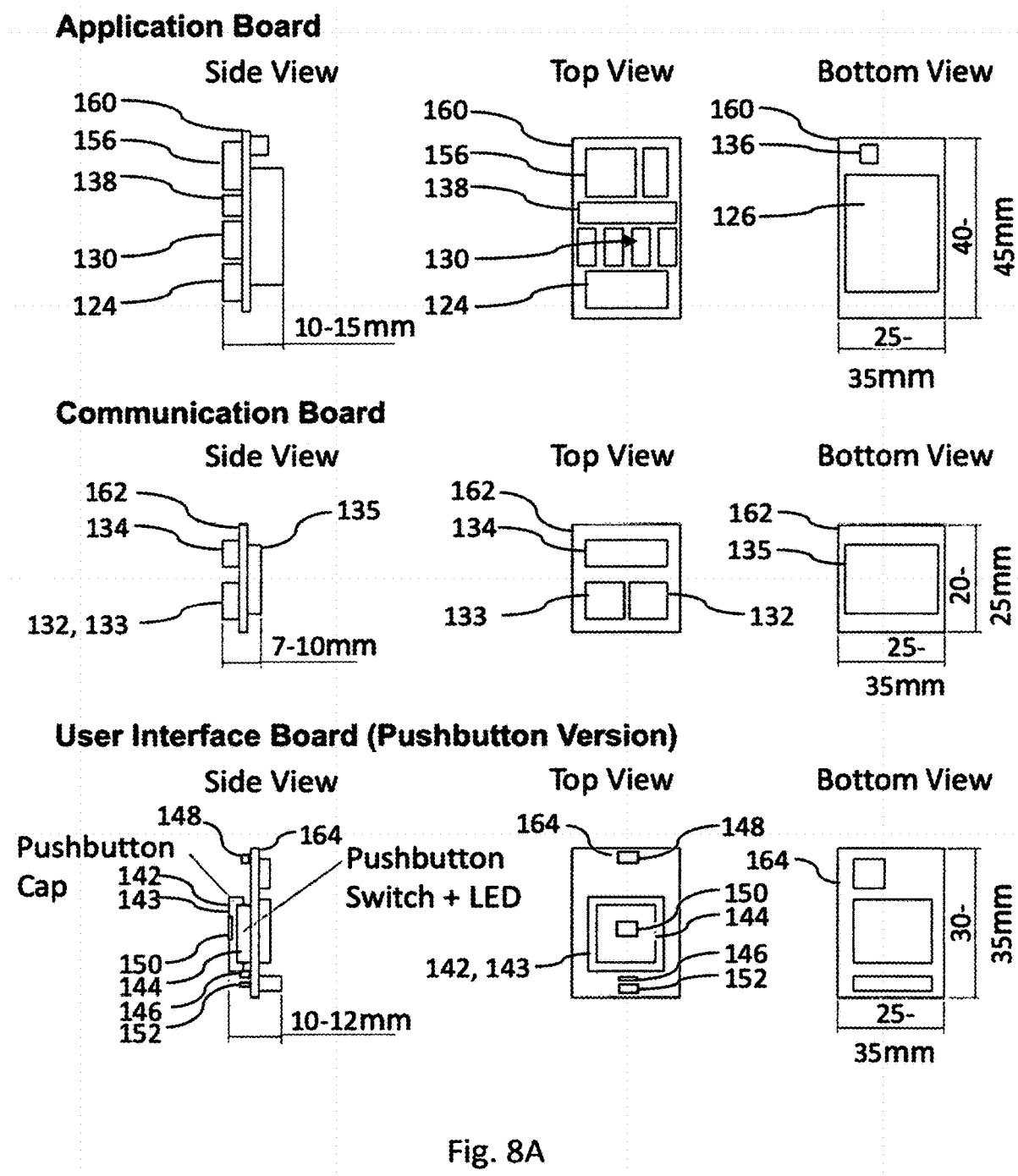
FIG. 8A shows three printed circuit boards of the vehicle operation and riding data collection device of FIG. 1 from a side view, a top view, and a bottom view.

Referring again to FIGS. 1-3, the internal electronic components of the vehicle operation and riding data collection device 100 (i.e., the power supply 124, the power source 126, the sensors 130, the global positioning antenna and receiver 132, 133, the communications elements 134, 135, 136, the memory 138, the display screen 142, the emergency pushbutton 143, the backlight LED 144, the microphone 146, the speaker 148, the biometric sensor 150, the connector 152, and/or the processor 156) can be arranged positionally within the internal cavity 108 in a great variety of ways. One or more printed circuit boards can be mounted within the internal cavity 108, arranged around the tubular hole 113, and the internal electronic components can be mounted on the printed circuit boards to provide the desired electrical interconnectivity. While the particular positional arrangement can be chosen from a large number of possibilities, generally, the internal components are arranged to fill the internal cavity 108. In the particular embodiment of FIGS. 1A, 2, and 3, three printed circuit boards are arranged around the tubular hole 113. FIG. 8A shows each of the three printed circuit boards from a side view, a top view, and a bottom view. Referring to FIGS. 1A, 2, 3, and 8A, on a first printed circuit board 160, the power supply 124, sensors 130, memory 138, processor 156, communications element 136 (e.g., a Bluetooth/Wi-Fi antenna), and power source 126 are mounted. On a second printed circuit board 162, communications element 135 (e.g., wireless modem), communications element 134 (e.g., cellular network antenna), and global positioning antenna and receiver 132, 133 are mounted. On a third printed circuit board 164, the pushbutton 142, the microphone 146, the speaker 148, the biometric sensor 150, and the connector 152 are mounted.

Figure 8B:
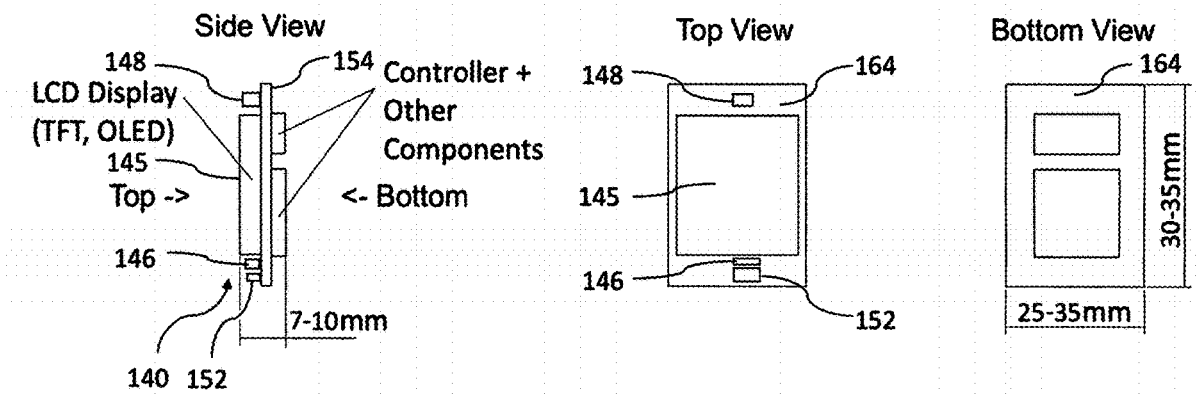
FIG. 8B shows a side view, a top view, and a bottom view of a user interface printed circuit board supporting components, according to the embodiment illustrated in FIG. 1B.

FIG. 8B shows the third printed circuit board 164 as it is configured for the embodiment of the vehicle operation and riding data collection device 100 of FIG. 1B. In this embodiment, on the printed circuit board 164, the display screen 145, the microphone 146, the speaker 148, and the connector 152 are mounted.

It is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A connected device for holistic data collection, comprising vehicle operation, riding and diagnostic data, from motorcycles, scooters, ATVs, snowmobiles, personal watercraft, and other powersports vehicles that use handlebars for steering control and a housing that do not feature a rearview mirror, comprising:

the housing defining an internal cavity designed to be put on a handlebar;

a power source supported by the housing in the internal cavity;

a communications element supported by the housing in the internal cavity;

a global positioning element supported by the housing in the internal cavity;

at least one sensor supported by the housing in the internal cavity; and a processor configured to manage the power source, the communications element, the global positioning element, and the at least one sensor, to perform functional features corresponding to providing emergency response capabilities, and riding and vehicle diagnostic data including engine parameters, vehicle's exact location, relative location to other riders, speed, acceleration, leaning angle, driving patterns, alerts, and more, and receiving device configuration settings, personal preferences, and other input from a user, as well as connecting to the cloud via cellular 4G or 5G network, to smart devices, including smartphones, smartwatches, laptops, personal computers, and the diagnostic device 200, described in U.S. Pat. No. 10,679,432, via Bluetooth and Wi-Fi, and to other vehicles and road infrastructure using V2V and V2X communication protocols.

2. The connected device of claim 1 that use handlebars for steering control and do not feature a rearview mirror, wherein the housing includes a vehicle's handlebar attachment element, a first housing member, and a second housing member configured to be coupled with the first housing member, at least one of the first housing member and the second housing member defining the internal cavity.

3. The connected device of claim 2 that use handlebars for steering control and do not feature a rearview mirror, wherein the vehicle attachment element includes a hinge at a first end of the second housing member, and wherein the second housing member is connected pivotally to the first housing member at the hinge, the second housing member pivotal from an open position to a closed position for a secure placement on a handlebar.

4. The connected device of claim 2 that use handlebars for steering control and do not feature a rearview mirror, wherein the vehicle attachment element includes a fastening element at a second end of the second housing member opposite the first end, the fastening element to fasten the first housing member to the second housing member in the closed position and prevent pivoting of the second housing member at the hinge with respect to the first housing member in order to provide a secure placement of the device on a handlebar.

5. The connected device of claim 2 that use handlebars for steering control and do not feature a rearview mirror, wherein the housing has a width and wherein when the second housing member is in the closed position the vehicle attachment element has a radially inward-facing annular wall defining a handlebar-receiving hole through the width in order to provide a secure placement of the device on a handlebar.

6. The connected device of claim 5 that use handlebars for steering control and do not feature a rearview mirror, further comprising handlebar-gripping pads lining the radially inward-facing annular wall in order to provide a secure placement of the device on a handlebar.

7. The connected device of claim 1, wherein the power source includes a battery.

8. The connected device of claim 1, wherein the communications element includes at least one from the group consisting of a wireless modem, a cellular network antenna, and a radio wireless local area networking antenna.

9. The connected device of claim 1, wherein the global positioning element includes at least one from the group consisting of a Global Positioning System receiver and a Global Positioning System antenna.

10. The connected device of claim 1, wherein the at least one sensor includes at least one from the group consisting of an accelerometer, a three-dimensional sensor, and a tilt sensor.

11. The connected device of claim 1, further comprising at least one printed circuit board supported by the housing in the internal cavity, the power source, the communications element, the global positioning element, and the at least one sensor being electrically coupled with and supported by the at least one printed circuit board.

12. The connected device of claim 11, wherein the at least one printed circuit board includes at least three printed circuit boards.

13. The connected device of claim 1, further comprising a user interface panel, the user interface panel including at least one from the group consisting of a display, an emergency button, a microphone, a speaker, a biometric sensor, a light source, and an electrical connector.

14. The connected device of claim 13, further comprising a cover that can be moved between a protective position covering the user interface panel and a non-protective position allowing visual and tactile access to the user interface panel.

15. The connected device of claim 1, wherein the user includes a vehicle operator, and the processor is configured to manage the power source, the communications element, the global positioning element, and the at least one sensor to provide to the user information including vehicle diagnostic data, suggested service procedures, location, riding stats, individual and group ride planning assistance, and operation and riding data recording and analytics, the information viewable via at least one from the group consisting of a personal computer, a smartphone, a tablet, a smartwatch, and a head-up display (HUD).

16. The connected device of claim 1, wherein the user includes an insurance company, fleet management company, rental company or a ride sharing company and the processor is configured to manage the power source, the communications element, the global positioning element, and the at least one sensor to provide to the user tamper-proof vehicle operation and riding data including mileage data, riding pattern data, crash detection data, and vehicle health data.

17. The connected device of claim 1, wherein the user includes a concierge service, and the processor is configured to manage the power source, the communications element, the global positioning element, and the at least one sensor to provide a hands-free voice call with the concierge service.

18. The connected device of claim 1, wherein the user includes an emergency service provider, and the processor is configured to manage the power source, the communications element, the global positioning element, and the at least one sensor to collect vehicle operation and riding data, determine a crash has occurred based on the vehicle operation and riding data, automatically make a hands-free voice call to the emergency service provider, and automatically send the vehicle operation and riding data indicative of the crash and a crash notification to the emergency service provider.

19. The connected device of claim 1, wherein the user includes a vehicle manufacturer and the processor is configured to manage the power source, the communications element, the global positioning element, and the at least one sensor to provide the user with a live feed of vehicle operation and riding data, the vehicle operation and riding data including riding patterns and vehicle health.

20. The connected device of claim 1, wherein the user includes a fleet manager, or a rental or a ride sharing company operator and the processor is configured to manage the power source, the communications element, the global positioning element, and the at least one sensor to provide tamper-proof, real-time vehicle operation and riding data including mileage data, riding pattern data, crash detection data, and vehicle health data.

21. The connected device of claim 1, wherein the communications element includes a wireless modem configured to communicate over Wi-Fi or Bluetooth with a vehicle diagnostic device.

22. The connected device of claim 1, wherein the communications element includes a wireless modem configured to communicate with a cloud-based platform that offers a portal to interface with the vehicle operation and riding data collection device, as well as secure data storage and transmission.

23. A connected system for holistic data collection, comprising vehicle operation, riding and diagnostic data, designed for a placement on the handlebars of motorcycles, scooters, ATVs, snowmobiles, personal watercraft, and other powersports vehicles comprising: a connected device as recited in claim 1; and a cloud-based platform configured to wirelessly communicate with the the connected device, the cloud-based platform including a vehicle operation and riding database, as well as secure data storage and transmission.

24. The connected system of claim 23, further comprising a diagnostic device configured to connect to a vehicle's on-board diagnostic (OBD) system to collect diagnostic and telemetry data, including vehicle's speed, mileage, battery voltage, various engine parameters, and vehicle sensor data.

25. The connected system of claim 24, wherein the diagnostic device is configured to wirelessly send the diagnostic and telemetry data to the vehicle operation and riding data collection device, and the vehicle operation and riding data collection device configured to receive the diagnostic data.

26. The connected system of claim 24, wherein the diagnostic device is configured to wirelessly send the diagnostic data to the cloud-based platform, and the cloud-based platform is configured to receive the diagnostic data securely.

* * * * *